(12) United States Patent
Littrell (10) Patent No.: US 9,030,153 B2
(45) Date of Patent: May 12, 2015

(54) SYSTEMS AND METHODS FOR DELIVERING ENERGY TO AN ELECTRIC VEHICLE WITH PARKING FEE COLLECTION

(75) Inventor: Nathan Bowman Littrell, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 400 days.

(21) Appl. No.: 12/341,846

(22) Filed: Dec. 22, 2008

(65) Prior Publication Data
US 2010/0161480 A1 Jun. 24, 2010

(51) Int. Cl.
| H02J 7/00 | (2006.01) |
| G06Q 40/00 | (2012.01) |
| G07F 17/24 | (2006.01) |
| G06Q 20/10 | (2012.01) |
| G06Q 20/28 | (2012.01) |
| G06Q 20/32 | (2012.01) |
| G06Q 50/06 | (2012.01) |
| G07B 15/02 | (2011.01) |
| G07F 15/00 | (2006.01) |
| B60L 11/18 | (2006.01) |

(52) U.S. Cl.
CPC .............. *G07F 17/24* (2013.01); *G06Q 20/102* (2013.01); *G06Q 20/28* (2013.01); *G06Q 20/3278* (2013.01); *G06Q 50/06* (2013.01); *G07B 15/02* (2013.01); *G07F 15/003* (2013.01); *B60L 11/1824* (2013.01); *Y02T 10/7005* (2013.01); *Y02T 90/12* (2013.01); *Y02T 90/121* (2013.01); *Y02T 90/14* (2013.01)

(58) Field of Classification Search
None
See application file for complete search history.

(56) References Cited

U.S. PATENT DOCUMENTS

| 3,775,593 | A | 11/1973 | Gieringer et al. |
| 4,052,655 | A | 10/1977 | Vizza |
| 4,090,577 | A | 5/1978 | Moore |
| 4,532,418 | A | 7/1985 | Meese et al. |
| 4,592,436 | A | 6/1986 | Tomei |
| 4,629,874 | A | 12/1986 | Pugsley et al. |
| 4,731,575 | A | 3/1988 | Sloan |
| 5,072,380 | A | 12/1991 | Randelman et al. |
| 5,101,200 | A | 3/1992 | Swett |
| 5,146,067 | A | 9/1992 | Sloan et al. |
| 5,202,617 | A | 4/1993 | Nor |
| 5,247,304 | A | 9/1993 | D'Hont |
| 5,266,947 | A | 11/1993 | Fujiwara et al. |

(Continued)

FOREIGN PATENT DOCUMENTS

| CN | 2573304 Y | 9/2003 |
| CN | 200953476 Y | 9/2007 |

(Continued)

OTHER PUBLICATIONS

EP Foreign Search Report for Application No. 09178313.4-2221 dated Jan. 26, 2010.

(Continued)

*Primary Examiner* — Jason M Borlinghaus
(74) *Attorney, Agent, or Firm* — General Electric Company (57) ABSTRACT

A method for delivering energy to an electric vehicle includes coupling the electric vehicle to an energy delivery point, delivering energy to the electric vehicle, determining a parking cost, and determining transaction costs based on at least one of an amount of energy delivered to the electric vehicle and the parking cost.

20 Claims, 3 Drawing Sheets

(56) References Cited

U.S. PATENT DOCUMENTS

| | | | |
|---|---|---|---|
| 5,296,746 A | 3/1994 | Burkhardt | |
| 5,297,664 A | 3/1994 | Tseng et al. | |
| 5,306,999 A | 4/1994 | Hoffman | |
| 5,316,101 A | 5/1994 | Gannon | |
| 5,327,066 A | 7/1994 | Smith | |
| 5,351,052 A | 9/1994 | D'Hont et al. | |
| 5,351,187 A | 9/1994 | Hassett | |
| 5,414,624 A | 5/1995 | Anthonyson | |
| 5,428,363 A | 6/1995 | D'Hont | |
| 5,451,755 A | 9/1995 | Duval et al. | |
| 5,459,304 A | 10/1995 | Eisenmann | |
| 5,461,298 A | 10/1995 | Lara et al. | |
| 5,462,439 A | 10/1995 | Keith | |
| 5,485,510 A | 1/1996 | Colbert | |
| 5,488,376 A | 1/1996 | Hurta et al. | |
| 5,491,483 A | 2/1996 | D'Hont | |
| 5,512,787 A | 4/1996 | Dederick | |
| 5,513,525 A | 5/1996 | Schurmann | |
| 5,534,759 A | 7/1996 | Evans et al. | |
| 5,548,200 A * | 8/1996 | Nor et al. | 320/109 |
| 5,552,789 A | 9/1996 | Schuermann | |
| 5,563,491 A | 10/1996 | Tseng | |
| 5,573,090 A | 11/1996 | Ross | |
| 5,577,109 A | 11/1996 | Stimson et al. | |
| 5,583,418 A | 12/1996 | Honda et al. | |
| 5,602,919 A | 2/1997 | Hurta et al. | |
| 5,604,342 A | 2/1997 | Fujioka | |
| 5,605,182 A | 2/1997 | Oberrecht et al. | |
| 5,614,808 A | 3/1997 | Konoya et al. | |
| 5,640,002 A | 6/1997 | Ruppert et al. | |
| 5,675,342 A | 10/1997 | Sharpe | |
| 5,684,379 A | 11/1997 | Svedoff | |
| 5,692,132 A | 11/1997 | Hogan | |
| 5,698,837 A | 12/1997 | Furuta | |
| 5,699,528 A | 12/1997 | Hogan | |
| 5,701,127 A | 12/1997 | Sharpe | |
| 5,704,046 A | 12/1997 | Hogan | |
| 5,742,229 A | 4/1998 | Smith | |
| 5,745,052 A | 4/1998 | Matsuyama et al. | |
| 5,774,882 A | 6/1998 | Keen et al. | |
| 5,797,085 A | 8/1998 | Beuk et al. | |
| 5,797,133 A | 8/1998 | Jones et al. | |
| 5,809,142 A | 9/1998 | Hurta et al. | |
| 5,828,738 A | 10/1998 | Spaeth | |
| 5,847,537 A | 12/1998 | Parmley, Sr. | |
| 5,878,215 A | 3/1999 | Kling et al. | |
| 5,887,266 A | 3/1999 | Heinonen et al. | |
| 5,905,247 A | 5/1999 | Ilen | |
| 5,955,717 A | 9/1999 | Vanstone | |
| 5,974,403 A | 10/1999 | Takriti et al. | |
| 5,987,140 A | 11/1999 | Rowney et al. | |
| 5,991,750 A | 11/1999 | Watson | |
| 5,998,963 A | 12/1999 | Aarseth | |
| 6,012,049 A | 1/2000 | Kawan | |
| 6,064,320 A | 5/2000 | d'Hont et al. | |
| 6,073,840 A | 6/2000 | Marion | |
| 6,081,205 A * | 6/2000 | Williams | 340/932.2 |
| 6,107,691 A | 8/2000 | Gore et al. | |
| 6,109,525 A | 8/2000 | Blomqvist et al. | |
| 6,112,152 A | 8/2000 | Tuttle | |
| 6,116,505 A | 9/2000 | Withrow | |
| 6,157,162 A | 12/2000 | Hayashi et al. | |
| 6,285,162 B1 * | 9/2001 | Koo | 320/132 |
| 6,317,721 B1 | 11/2001 | Hurta et al. | |
| 6,340,935 B1 | 1/2002 | Hall | |
| 6,481,622 B2 | 11/2002 | Hjelmvik | |
| 6,487,508 B1 | 11/2002 | Suzuki et al. | |
| 6,513,015 B2 | 1/2003 | Ogasawara | |
| 6,547,133 B1 | 4/2003 | DeVries, Jr. et al. | |
| 6,586,668 B2 | 7/2003 | Shugar et al. | |
| 6,609,655 B1 | 8/2003 | Harrell | |
| 6,614,204 B2 | 9/2003 | Pellegrino et al. | |
| 6,656,778 B1 | 12/2003 | Chen et al. | |
| 6,673,479 B2 | 1/2004 | McArthur et al. | |
| 6,696,925 B1 | 2/2004 | Aiello, Jr. | |
| 6,714,844 B1 | 3/2004 | Dauner et al. | |
| 6,756,765 B2 | 6/2004 | Bruning | |
| 6,758,291 B1 | 7/2004 | Koch | |
| 6,836,737 B2 | 12/2004 | Petite et al. | |
| 6,910,439 B2 | 6/2005 | Baba et al. | |
| 6,963,186 B2 | 11/2005 | Hobbs | |
| 7,081,832 B2 | 7/2006 | Nelson et al. | |
| 7,141,321 B2 | 11/2006 | McArthur et al. | |
| 7,142,099 B2 | 11/2006 | Ross et al. | |
| 7,209,840 B2 | 4/2007 | Petite et al. | |
| 7,236,103 B2 | 6/2007 | Pammer et al. | |
| 7,239,226 B2 | 7/2007 | Berardi et al. | |
| 7,249,112 B2 | 7/2007 | Berardi et al. | |
| 7,312,707 B1 | 12/2007 | Bishop et al. | |
| 7,338,335 B1 | 3/2008 | Messano | |
| 7,411,371 B2 | 8/2008 | Hobbs | |
| 7,429,112 B2 | 9/2008 | Metcalfe | |
| 7,434,636 B2 | 10/2008 | Sutherland | |
| 7,469,541 B1 | 12/2008 | Melton et al. | |
| RE41,085 E | 1/2010 | Anthonyson | |
| 7,693,609 B2 | 4/2010 | Kressner et al. | |
| 7,792,613 B2 | 9/2010 | Kressner et al. | |
| 7,885,893 B2 | 2/2011 | Alexander | |
| 8,019,483 B2 | 9/2011 | Keefe | |
| 2001/0026609 A1 | 10/2001 | Weinstein et al. | |
| 2002/0052754 A1 | 5/2002 | Joyce et al. | |
| 2002/0132144 A1 | 9/2002 | McArthur et al. | |
| 2003/0004792 A1 | 1/2003 | Townzen et al. | |
| 2003/0105662 A1 | 6/2003 | Koketsu et al. | |
| 2003/0120442 A1 | 6/2003 | Pellegrino et al. | |
| 2003/0129884 A1 | 7/2003 | Wakamatsu | |
| 2003/0146852 A1 * | 8/2003 | O'Dell | 340/932.2 |
| 2003/0209375 A1 | 11/2003 | Suzuki et al. | |
| 2004/0079799 A1 | 4/2004 | Symonds et al. | |
| 2004/0104814 A1 | 6/2004 | Christensen et al. | |
| 2004/0153782 A1 | 8/2004 | Fukui et al. | |
| 2004/0200899 A1 | 10/2004 | Jeng et al. | |
| 2005/0008132 A1 | 1/2005 | Paschini et al. | |
| 2005/0057373 A1 | 3/2005 | Noguchi | |
| 2005/0119010 A1 | 6/2005 | Yasukawa | |
| 2005/0273505 A1 | 12/2005 | Kim | |
| 2006/0012473 A1 | 1/2006 | Bishop et al. | |
| 2006/0041513 A1 | 2/2006 | Yuhara et al. | |
| 2006/0180647 A1 | 8/2006 | Hansen | |
| 2006/0193282 A1 | 8/2006 | Ikawa et al. | |
| 2006/0202862 A1 | 9/2006 | Ratnakar | |
| 2006/0259447 A1 | 11/2006 | Kings et al. | |
| 2007/0094069 A1 | 4/2007 | Berman | |
| 2007/0126395 A1 | 6/2007 | Suchar | |
| 2007/0255612 A1 | 11/2007 | Baraty | |
| 2008/0039979 A1 | 2/2008 | Bridges et al. | |
| 2008/0039980 A1 | 2/2008 | Pollack et al. | |
| 2008/0039989 A1 | 2/2008 | Pollack et al. | |
| 2008/0040223 A1 | 2/2008 | Bridges et al. | |
| 2008/0040263 A1 | 2/2008 | Pollack et al. | |
| 2008/0040295 A1 | 2/2008 | Kaplan et al. | |
| 2008/0040296 A1 | 2/2008 | Bridges et al. | |
| 2008/0040479 A1 | 2/2008 | Bridge et al. | |
| 2008/0052145 A1 | 2/2008 | Kaplan et al. | |
| 2008/0067974 A1 | 3/2008 | Zhang et al. | |
| 2008/0150284 A1 | 6/2008 | Fein et al. | |
| 2008/0150290 A1 | 6/2008 | Fein et al. | |
| 2008/0203966 A1 | 8/2008 | Ward | |
| 2008/0203973 A1 | 8/2008 | Gale et al. | |
| 2008/0228613 A1 | 9/2008 | Alexander | |
| 2008/0270227 A1 | 10/2008 | Al Amri | |
| 2008/0281663 A1 | 11/2008 | Hakim et al. | |
| 2009/0062967 A1 | 3/2009 | Kressner et al. | |
| 2009/0062997 A1 | 3/2009 | Iwase et al. | |
| 2009/0091291 A1 | 4/2009 | Woody et al. | |
| 2009/0115371 A1 | 5/2009 | Chawla et al. | |
| 2009/0144150 A1 | 6/2009 | Sakakibara et al. | |
| 2009/0174365 A1 | 7/2009 | Lowenthal et al. | |
| 2009/0177580 A1 | 7/2009 | Lowenthal et al. | |
| 2009/0177595 A1 | 7/2009 | Dunlap et al. | |
| 2009/0224869 A1 | 9/2009 | Baker et al. | |
| 2009/0313033 A1 | 12/2009 | Hafner et al. | |
| 2009/0313034 A1 | 12/2009 | Ferro et al. | |
| 2009/0313103 A1 | 12/2009 | Ambrosio et al. | |

(56) References Cited

U.S. PATENT DOCUMENTS

| | | |
|---|---|---|
| 2009/0313104 A1 | 12/2009 | Hafner et al. |
| 2010/0010685 A1 | 1/2010 | Kang |
| 2010/0045232 A1 | 2/2010 | Chen et al. |
| 2010/0049639 A1 | 2/2010 | Ferro et al. |
| 2010/0065627 A1 | 3/2010 | Outwater |
| 2010/0079004 A1 | 4/2010 | Keefe |
| 2010/0082464 A1 | 4/2010 | Keefe |
| 2010/0141203 A1 | 6/2010 | Graziano et al. |
| 2010/0145837 A1 | 6/2010 | Graziano et al. |
| 2010/0145885 A1 | 6/2010 | Graziano et al. |
| 2011/0153131 A1 | 6/2011 | Kressner et al. |
| 2011/0153474 A1 | 6/2011 | Tormey et al. |

FOREIGN PATENT DOCUMENTS

| | | |
|---|---|---|
| CN | 101076190 A | 11/2007 |
| CN | 101082959 A | 12/2007 |
| DE | 10304284 A1 | 8/2004 |
| EP | 0479290 A2 | 4/1992 |
| EP | 1205340 A1 | 5/2002 |
| EP | 1588930 A1 | 10/2005 |
| EP | 1862986 A1 | 5/2007 |
| GB | 2430529 A | 3/2007 |
| GB | 2438979 A | 12/2007 |
| JP | 05256038 A | 5/1993 |
| JP | 2010-512727 | 2/2000 |
| JP | 2002150337 A | 5/2002 |
| JP | 2006215779 A | 8/2006 |
| JP | 2008-065635 A | 3/2008 |
| JP | 2000-045869 A | 4/2010 |
| WO | 02063742 A1 | 8/2002 |
| WO | 2007141543 A2 | 12/2007 |
| WO | 2008073453 A1 | 6/2008 |
| WO | 2008107767 A2 | 9/2008 |

OTHER PUBLICATIONS

European Patent Office Search Report, EP09178316, Reference 233500114458, Application No./Patent No. 09178316.7-2221, Feb. 12, 2010, 7 pages.

PCT, International Search Report for International Patent Application No. PCT/US2009/065229, dated Feb. 25, 2010, 4 pages.

European Patent Office, Search Report for European Patent Application No. 09178452.0-2207, dated Mar. 23, 2010, 4 pages.

Rich Housh & Kathy Ellington, "Plug-in Hybrid Electric Vehicle Smart Charging," available at http://www.eei.org/meetings/Meeting%20Documents/2009-04-05-Mon-Ellington.pdf (last visited Jul. 23, 2009).

Radio Frequency Identification Tag Application for Tracking Vehicle Refueling, Maintenance, and Theft, XP000694521, IBM Technical Disclosure Bulletin, Mar. 1997, pp. 81-82, vol. 40, No. 03.

Green Car Versatile Plug, ip.com Prior Art Database, http://www.ip.com/pubview///IPCOM000177564D, IBM, Dec. 18, 2008, 4 pages.

C.M. Roberts, Radio Frequency Identification (RFID), Department of Information Sciences, Otago University, New Zealand, Science Direct, Computers & Security, 2006, pp. 18-26, vol. 25, Elsevier Ltd.

Patent Cooperation Treaty, PCT/US2009/065356, Notification of Transmittal of the International Search Report and the Written Opinion of the International Searching Authority, or the Declaration, Mar. 31, 2010, 14 pages.

Patent Cooperation Treaty, PCT/US2009/066930, Notification of Transmittal of the International Search Report and the Written Opinion of the International Searching Authority, or the Declaration, Jun. 25, 2010, 10 pages.

The Associated Press, Hawaii to be First with Electric Car Stations, Dec. 3, 2008, 2 pages, MSNBC.com.

Chinese Search Report for Application 200980152817.8 dated Dec. 11, 2012.

Chinese Office Action for Application 200980152817.8 dated Dec. 26, 2012.

Chinese Office Action for Application 200980152855.3 dated Jan. 14, 2013.

Chinese Search Report for Application 200980152855.3 dated Dec. 20, 2012.

Unofficial translation of Japanese Office Action for Japanese Application No. 2011-542190 dated Oct. 8, 2013.

Unofficial translation of Chinese Office Action for Chinese Application No. 200980152855.3 dated Sep. 16, 2013.

Unofficial translation of Chinese Office Action for Chinese Application No. 200980152855.3 dated Sep. 5, 2013..

IBM Technical Disclosure, Green Car Versatile Plug, IPCOM000177564D, Dec. 28, 2008.

JP Office Action for related application 2011542190 dated May 20, 2014, 3 pp.

\* cited by examiner

SYSTEMS AND METHODS FOR DELIVERING ENERGY TO AN ELECTRIC VEHICLE WITH PARKING FEE COLLECTION

BACKGROUND OF THE INVENTION

The embodiments described herein relate generally to delivering energy to an electric vehicle and, more particularly, to metering and automatically charging for energy delivered and parking time at a parking meter.

As electric vehicles and/or hybrid electric vehicles gain popularity, an associated need to accurately manage delivery of electrical energy to them has increased. Moreover, a need to recognize revenue owed to the utility that provides the energy has been created by the increased use of such vehicles.

At least some known parking metering systems enable a customer to pay a parking fee without inserting money in a coin drop. Such systems enable, for example, a customer to identify their vehicle and control payment of the parking fee using a device, such as a cellular phone. In at least some such systems, a parking fee register tracks a parking fee based on time, wherein the fee is determined based on a vehicle code that is read by a control device. The control device also reports payment status and/or other related information to and from the parking fee register. However, such parking metering systems do not enable delivery of energy to an electric vehicle.

Moreover, at least some known automatic debiting systems for use in payment of parking fees enable a customer to pay the parking fee without inserting money in a coin drop. For example, some known systems use a stationary radio frequency (RF) transmitter unit that transmits a parking fee rate and/or a maximum parking period to a transponder carried within a vehicle. The transponder includes a memory that may be preloaded with a prepaid credit, and after the vehicle is parked, the transponder is activated to communicate with the RF transmitter to facilitate automatic debiting of a parking fee from the prepaid credit stored in the transponder memory. However, known systems do not enable delivery of energy to an electric vehicle after recognizing the transponder.

Accordingly, it is desirable to provide systems and methods for delivering energy to an electric vehicle while parked at a parking meter, metering an amount of energy delivered to the electric vehicle and/or an amount of time the electric vehicle is parked at the parking meter, and adjusting an account according to a transaction amount that is based on the amount of energy delivered and/or the parking cost.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for delivering energy to an electric vehicle. The method includes coupling the electric vehicle to an energy delivery point, delivering energy to the electric vehicle, determining a parking cost associated with the electric vehicle, and determining transaction costs based on at least one of an amount of energy delivered to the electric vehicle and the parking cost.

In another aspect, a system is provided for delivering energy to an electric vehicle. The system includes an energy delivery point configured to couple to the electric vehicle via a connector and a server sub-system coupled to the energy delivery point via a network. The energy delivery point delivers energy to the electric vehicle via the connector. The server sub-system determines a parking cost for the electric vehicle, and determines transaction costs based on at least one of an amount of energy delivered to the electric vehicle and the parking cost.

In another aspect, an energy delivery point is provided for use with a system for delivering energy to an electric vehicle. The energy delivery point is configured to couple to the electric vehicle via a connector, receive a unique identifier from the electric vehicle to facilitate identifying a balance of an account associated with the identifier, deliver energy to the electric vehicle via the connector, meter an amount of energy delivered to the electric vehicle, and display a transaction cost that is based on at least one of the amount of energy delivered to the electric vehicle and a parking cost.

BRIEF DESCRIPTION OF THE DRAWINGS

The embodiments described herein may be better understood by referring to the following description in conjunction with the accompanying drawings.

DETAILED DESCRIPTION OF THE INVENTION

In some embodiments, the term "electric vehicle" refers generally to a vehicle that includes one or more electric motors that are used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a general power outlet. Accordingly, the term "electric vehicle" as used herein may refer to a hybrid electric vehicle or any other vehicle to which electrical energy may be delivered, for example, via the power grid.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary parking and/or metering system environment, embodiments of the invention are operational with numerous other general purpose or special purpose computing system environments or configurations. The system environment is not intended to suggest any limitation as to the scope of use or functionality of any aspect of the invention. Moreover, the system environment should not be interpreted as having any dependency or requirement relating to any one or combination of components illustrated in the exemplary operating environment. Examples of well known systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

A technical effect of the methods, systems, and computers described herein includes at least one of (a) coupling an electric vehicle to an energy delivery point at a parking area, such as a parking meter; (b) determining a current balance of an account associated with the electric vehicle by receiving a unique identifier embedded within the electric vehicle, determining an account associated with the identifier, and determining the current balance of the account; (c) determining whether to approve or deny energy delivery service and/or parking service to the electric vehicle; (d) delivering energy to the electric vehicle; (e) metering an amount of energy delivered and an amount of parking time of the electric vehicle; (f) determining a transaction amount based on a parking cost and an energy cost; (g) adjusting the transaction cost according to a validator identifier received by the energy delivery point; and (h) generating a confirmation of a receipt of the delivered energy.

Figure 1:
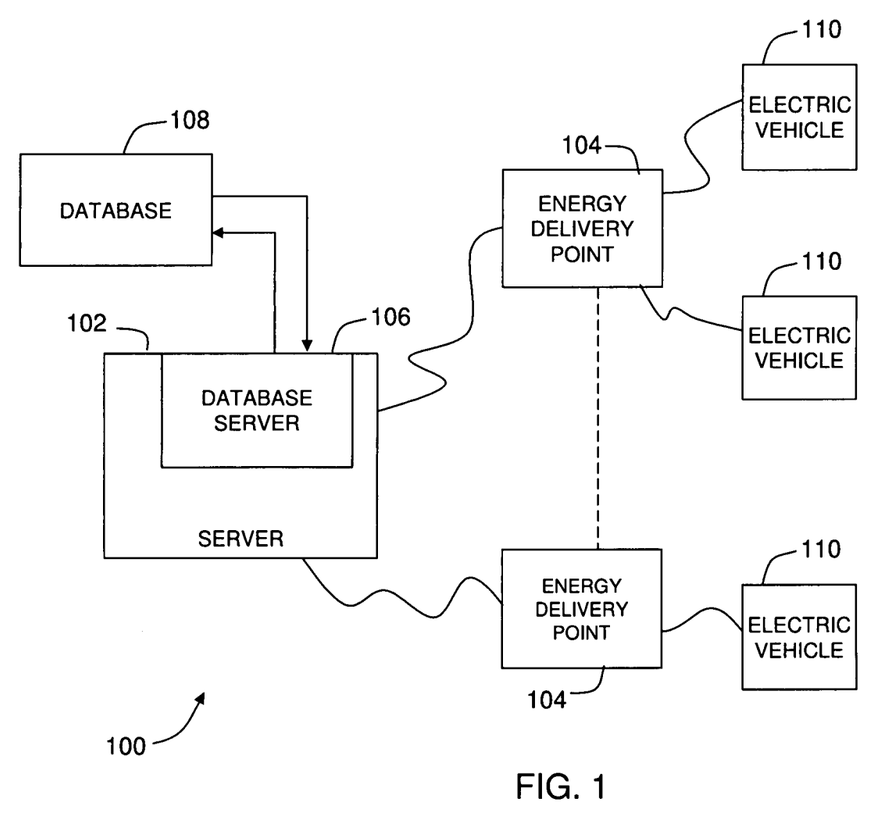
FIG. 1 is a block diagram of an exemplary system for providing electricity to an electric vehicle.

FIG. 1 is a simplified block diagram of an exemplary system 100 for providing electricity to an electric vehicle 110. In the exemplary embodiment, system 100 includes a server system 102 and an energy delivery point 104 that is coupled to server system 102. As shown in FIG. 1, server system 102 may be coupled to a plurality of energy delivery points 104. In one embodiment, energy delivery points 104 include a network link (not shown in FIG. 1) that enables each energy delivery point 104 to access server system 102 over a network, such as the Internet and/or an intranet. Energy delivery points 104 are interconnected to the Internet through many interfaces including a network, such as a local area network (LAN), a wide area network (WAN), dial-in-connections, cable modems, wireless modems, and/or special high-speed Integrated Services Digital Network (ISDN) lines. A database server 106 is connected to a database 108 containing information on a variety of matters, such as account information related to electric vehicle energy distribution and/or vehicular parking. In one embodiment, centralized database 108 is stored on server system 102 and is accessed directly via at least one energy delivery point 104. In an alternative embodiment, database 108 is stored remotely from server system 102 and may be non-centralized.

Moreover, in the exemplary embodiment, each energy delivery point 104 is capable of providing energy, such as electrical energy, to one or more electric vehicles 110. Each electric vehicle 110 stores the energy therein and uses the stored energy for propulsion, rather than, or in addition to, more conventional energy sources, such as gasoline. Moreover, each energy delivery point 104 is capable of monitoring an amount of time during which electric vehicle 110 is parked at energy delivery point 104 and determining a parking cost based on the amount of time during which electric vehicle 110 is parked. As such, energy delivery point 104 may be implemented as a parking meter that is capable of delivery energy to electric vehicle 110.

As described in more detail below, each electric vehicle 110 includes a unique identifier that is used by energy delivery point 104 and/or server 102 to identify that electric vehicle 110 and/or an account associated with electric vehicle 110. For example, database 108 may include transactional and/or accounting data related to payment information associated with an amount of energy that has been paid for in advance for later distribution to electric vehicle 110 and/or that will be billed to an account holder at a later time. Moreover, database 108 may include historical energy distribution data, such as transaction dates, and/or an amount of energy delivered to electric vehicle 110 for each transaction. Further, database 108 may include historical payment information, such as payment dates and/or payment amounts.

The embodiments illustrated and described herein as well as embodiments not specifically described herein, but within the scope of aspects of the invention constitute exemplary means for providing metering for an electric vehicle, and more particularly, exemplary means for providing energy distribution, energy metering, and/or parking metering for an electric. For example, server system 102, delivery point 104, or any other similar computer device that is programmed with computer-executable instructions as illustrated in FIG. 1, provides exemplary means for providing energy distribution, energy metering, and/or parking metering for an electric vehicle.

Figure 2:
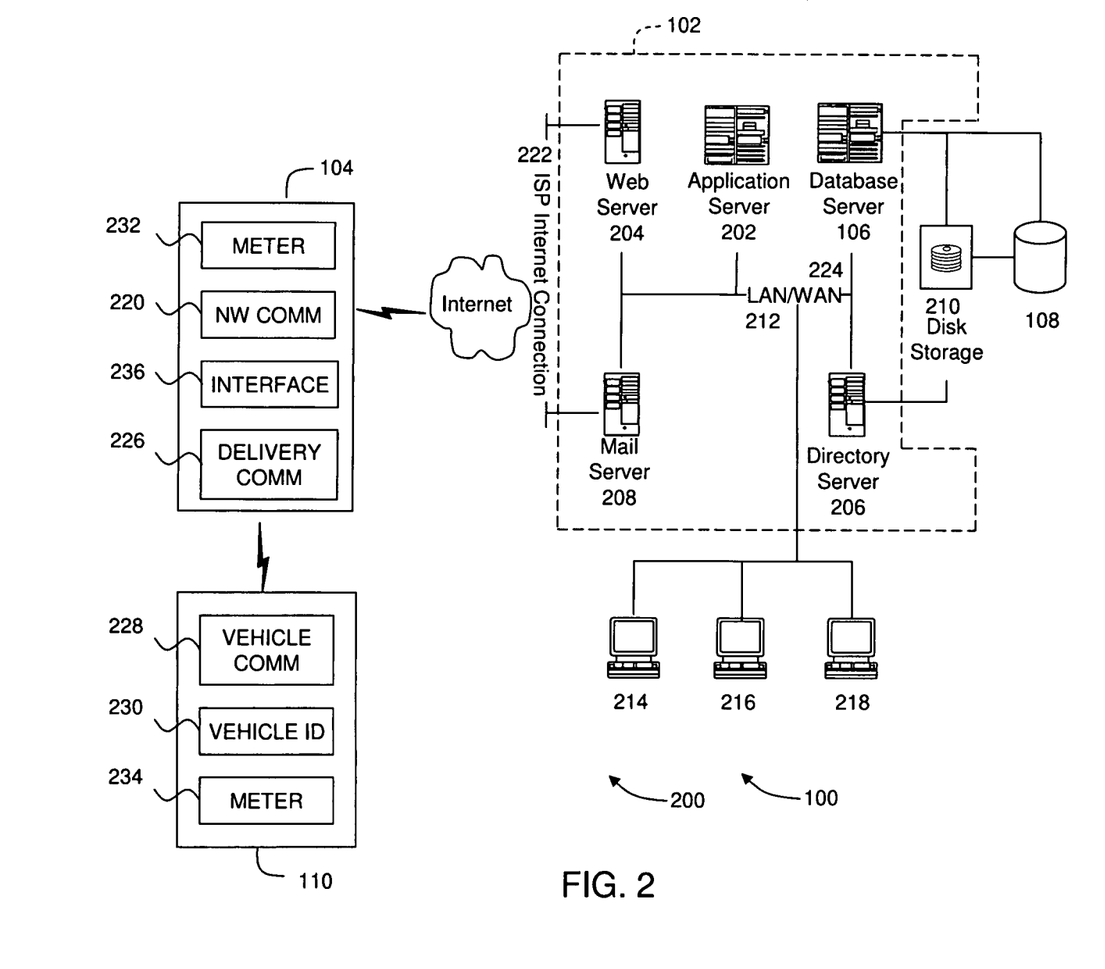
FIG. 2 is an expanded block diagram of an exemplary embodiment of a system architecture of the system shown in FIG. 1.

FIG. 2 is an expanded block diagram of an exemplary embodiment of a system architecture 200 of system 100 (shown in FIG. 1). Components in system architecture 200, identical to components of system 100, are identified in FIG. 2 using the same reference numerals used in FIG. 1. In the exemplary embodiment, system 200 includes server system 102 and energy delivery points 104. Server system 102 also includes database server 106, an application server 202, a web server 204, a directory server 206, and a mail server 208. A disk storage unit 210 is coupled to database server 106 and directory server 206. Examples of disk storage unit 210 may include, but are not limited to only including, a Network Attached Storage (NAS) device and a Storage Area Network (SAN) device.

In the exemplary embodiment, database server 106 is also coupled to database 108. Servers 106, 202, 204, 206, 206, and 208 are coupled in a local area network (LAN) 212. Moreover, a system administrator workstation 214, a user workstation 216, and a supervisor workstation 218 may be coupled to LAN 212 to enable communication with server system 102. Alternatively, workstations 214, 216, and 218 may be coupled to LAN 212 using an Internet link or may be coupled through an intranet. In one embodiment, an owner or user of electric vehicle 110 may access server system 202 via web server 204 to access, for example, the user's account and/or a payment service that enables the user to pay for energy that have been delivered to electric vehicle 110 or will be delivered to electric vehicle 110 and/or parking services relating to electric vehicle 110. For example, the user may use such a payment service to pay a monthly parking fee. Moreover, in one embodiment, mail server 208 may be configured to send a message, such as an email message, to the user when the user's account balance falls below a predetermined threshold. Alternatively, a user may setup a periodic reminder, wherein mail server 208 transmits a message to the user at a configurable periodic rate or when the account balance reaches a predetermined threshold value as a reminder to prepay for energy to be delivered later to electric vehicle 110 or a periodic parking fee.

Each energy delivery point 104 includes a network communication module 220 that communicates with server system 102. For example, server system 102 is configured to be communicatively coupled to energy delivery points 104 to enable server system 102 to be accessed using an Internet connection 222 provided by an Internet Service Provider (ISP). The communication in the exemplary embodiment is illustrated as being performed using the Internet, however, any suitable wide area network (WAN) type communication can be utilized in alternative embodiments. More specifically, the systems and processes are not limited to being practiced using only the Internet. In addition, local area network 212 may be used, rather than WAN 224. Each energy delivery point 104 also includes a delivery point communication module 226 that enables energy delivery point 104 to communicate with one or more electric vehicles 110. In addition, local area network 212 may be used rather than WAN 224.

Moreover, in the exemplary embodiment, energy delivery points 104 are electrically and/or communicatively coupled to one or more electric vehicles 110. Each electric vehicle 110 includes a vehicle communication module 228 that enables electric vehicle 110 to communicate with energy delivery point 104. More specifically, vehicle communication module 228 enables electric vehicle 110 to acquire energy from energy delivery point 104 via delivery point communication module 226.

To enable communication between electric vehicle 110 and server system 102 via energy delivery point 104, in the exemplary embodiment, electric vehicle 110 includes a unique vehicle identifier 230 that is embedded within electric vehicle 110. Identifier 230 may be implemented as, for example, a radio frequency identification (RFID) chip. Alternatively, identifier 230 may be implemented as a tag that is embedded in any communication transmitted to energy delivery point 104 from electric vehicle 110 or from energy delivery point 104 to electric vehicle 110. For example, identifier 230 may be included in wireless communication packets transmitted between vehicle communication module 228 and delivery point communication module 226. In another example, identifier 230 may be included in communication packets transmitted between vehicle communication module 228 and delivery point communication module 226 via a physical connection. Moreover, identifier 230 may be implemented using a bar code that is readable by a bar code reader (not shown) coupled to energy delivery point 104. Furthermore, identifier 230 may be implemented using a two-dimensional bar code that is readable by a compatible bar code reader that is coupled to energy delivery point 104. In some embodiments, identifier 230 is a passive tag that does not broadcast information embedded within the identifier 230 but rather, the tag is read or scanned by a reader or scanner that is coupled to energy delivery point 104.

In the exemplary embodiment, identifier 230 is linked in database 108 to an account associated with electric vehicle 110, in which an account balance is maintained including payments that have been made to the account by the account owner. Alternatively, identifier 230 may be linked to an account that is associated with a person, such that an account balance allocated among one or more electric vehicles 110. Further, in the exemplary embodiment, each energy delivery point 104 includes an energy meter 232 that tracks an amount of energy delivered to electric vehicle 110. Moreover, electric vehicle 104 includes an energy meter 234 that tracks an amount of energy received by electric vehicle 110.

In addition, in the exemplary embodiment, energy delivery point 104 includes an interface 236 that displays either a parking and/or an energy delivery payment status of electric vehicle 110. For example, energy delivery point 104 may be implemented as a parking meter that tracks an amount of energy delivered to electric vehicle 110 and/or a parking cost associated with electric vehicle 110. In one embodiment, energy delivery point 104 tracks an amount of energy delivered to electric vehicle 110 while server system 102 tracks a parking cost associated with electric vehicle 110. The parking cost may be a flat rate that enables electric vehicle 110 to remain at energy delivery point 104 for a predetermined amount of time. Alternatively, the parking cost may be based on an amount charged per unit time, such as a number of dollars per hour. In some embodiments, the parking rate may change based on the area, i.e., a peak usage area, of the parking space occupied by electric vehicle 110, and/or based on the time of day, i.e., a peak usage time, during which electric vehicle 110 occupies energy delivery point 104. In such an embodiment, interface 236 displays a payment status that indicates that electric vehicle 110 has paid in advance for the parking cost and/or energy delivery cost. In an alternative embodiment, interface 236 displays a payment status that indicates that the account associated with identifier 230 contains sufficient funds to pay for the parking cost and energy delivery cost until a particular parking time and/or a particular amount of energy has been delivered. In another alternative embodiment, once a predetermined amount of parking time has passed and/or a predetermined amount of energy has been delivered, indicator 236 may display a status that the account associated with identifier 230 no longer has sufficient funds, and/or the amount paid in advance has run out.

During use, a customer guides electric vehicle 110 to a parking meter that includes energy delivery point 104. In the exemplary embodiment, when the customer wishes to charge electric vehicle 110 at energy delivery point 104, and after electric vehicle 110 is coupled to energy delivery point 104, electric vehicle 110 is recognized by energy delivery point 104 via identifier 230. More specifically, in one embodiment, energy delivery point 104 reads identifier 230 using, for example, an RFID reader, wherein identifier 230 is an RFID chip. Alternatively, energy delivery point 104 and electric vehicle 110 may be communicatively coupled by an active wireless connection, and identifier 230 may be transmitted via vehicle communication module 228 to delivery point communication module 226 using a wireless connection. In another example, energy delivery point 104 and electric vehicle 110 may be communicatively coupled by a physical communication connection, and identifier 230 may be transmitted by vehicle communication module 228 to delivery point communication module 226 via the physical connection.

In the exemplary embodiment, energy delivery point 104 transmits identifier 230 to server system 102 to determine an account associated with identifier 230. In an alternative embodiment, permission may be granted to access the customer's account after the customer inputs a code and/or an account number into a terminal within energy delivery point 104. In another alternative embodiment, delivery point communication module 226 may be located remotely from energy delivery point 104, such as at an entrance to a parking facility that includes a plurality of energy delivery points 104 and/or parking meters. In such an embodiment, identifier 230 may be transmitted by electric vehicle 110 and/or received by delivery point communication module 226 and transmitted to server system 102 prior to providing electric vehicle 110 with access to the parking facility.

In the exemplary embodiment, after server system 102 has identified an account associated with identifier 230, server system 102 determines an account balance. If the account balance meets a predetermined threshold, server system 102 instructs energy delivery point 104 to enable service to electric vehicle 110. If the account balance does not meet a predetermined threshold, server system 102 may instruct energy delivery point 104 to deny service to electric vehicle 110 and/or display a message to the customer stating the reason for the denial. In such a case, server system 102 may issue a temporary credit to the account balance. In one embodiment, energy delivery point 104 meters energy delivery to electric vehicle using a different rate, such as a higher billing rate, when a temporary credit is issued. In an alternative embodiment, server system 102 may instruct energy delivery point 104 to deny service to electric vehicle 110 when the account associated with identifier 230 has been put into a "hold" status. A hold status may be placed on the account based on, for example, a delinquent payment by the customer and/or a report of electric vehicle 110 being stolen. Moreover, in another embodiment, energy delivery point 104 may display, via interface 236, an amount of time during which electric vehicle 110 may occupy the parking space and an amount of energy that may be delivered to electric vehicle 110 based on the current account balance.

In the exemplary embodiment, when service to electric vehicle 110 is enabled, energy delivery point 104 will deliver an amount of energy to electric vehicle 110. During delivery, energy delivery point 104 and electric vehicle 110 both meter an amount of energy delivered and/or a transaction amount related to the amount of energy delivered, via delivery point meter 232 and vehicle meter 234, respectively. A final transaction amount is determined at the conclusion of the energy delivery, and the final transaction amount is transmitted to server system 102. In one embodiment, the final transaction amount includes both a parking cost and an energy cost. The parking cost may be based on, for example, a duration of use of the parking space by electric vehicle 110. Moreover, the parking cost may be based on use, by electric vehicle 110, of a parking space designated for energy distribution, wherein such a designated space has a parking billing rate that is, for example, higher than a parking billing rate of a parking space that is not designated for energy distribution and/or that is not located in proximity to energy delivery point 104. The energy cost may be based on, for example, an energy billing rate that depends on a location of the parking space used.

In one embodiment, the parking cost and/or the energy cost may be validated. In such an embodiment, energy delivery point 104 determines an identity of the validating party. The validator identifier is then used by server system 102 to determine, for example, whether the parking cost is to be adjusted and/or by what amount the parking cost is to be adjusted. Moreover, the validator identifier may be used by server system 102 to determine whether the energy cost is to be adjusted and/or by what amount the energy cost is to be adjusted. In some embodiments, the entire transaction cost may be adjusted by server system 102 based on the validator identifier.

In the exemplary embodiment, server system 102 then deducts the final transaction amount from the account balance. If the final transaction amount is greater than the account balance, server system 102 may issue a temporary credit using a different rate, such as a higher billing rate, as described above. In addition, in one embodiment, upon the conclusion of energy delivery, delivery point meter 232 and vehicle meter 234 compare the amount of energy delivered and/or the final transaction amount. If the comparison results in a match, then vehicle meter 234 generates a receipt. In one embodiment, the receipt is stored in vehicle meter 234. In another embodiment, the receipt is also transmitted to energy delivery point 104 for storage in server system 102.

Figure 3:
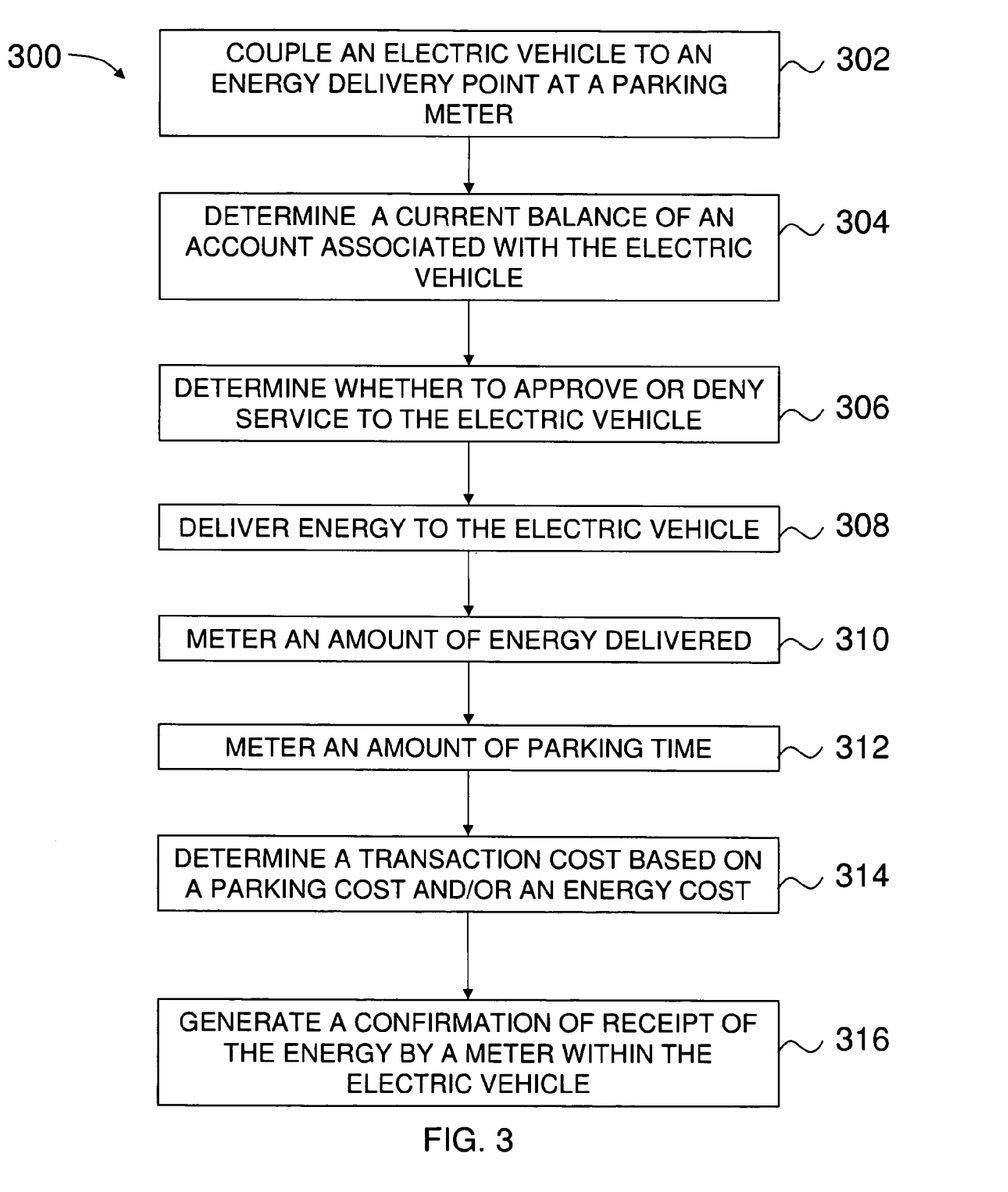
FIG. 3 is a flowchart illustrating an exemplary method for delivering energy to electric vehicle within a parking garage using the system shown in FIGS. 1 and 2.

FIG. 3 is a flowchart 300 illustrating an exemplary method for delivering energy to electric vehicle 110 (shown in FIGS. 1 and 2) while parked at a parking meter. In the exemplary embodiment, electric vehicle 110 is coupled 302 to energy delivery point 104 (shown in FIGS. 1 and 2). More specifically, in one embodiment, after being coupled to energy delivery point 104, electric vehicle 110 is identified via a unique identifier 230 (shown in FIGS. 1 and 2) embedded in electric vehicle 110.

In one embodiment, identifier 230 is stored in an RFID tag and energy delivery point 104 includes an RFID reader that reads identifier 230. In an alternative embodiment, energy delivery point 104 receives identifier 230 via an actively-powered wireless link. In another alternative embodiment, energy delivery point 104 receives identifier 230 via a physical connection between electric vehicle 110 and energy delivery point 104. In the exemplary embodiment, electric vehicle 110 and, more specifically, identifier 230 is associated with a customer account.

When identifier 230 has been read, a current balance of the customer account associated with identifier 230 is determined 304. More specifically, energy delivery point 104 transmits identifier 230 to server system 102 using, for example, the Internet and/or an intranet. Server system 102 then determines the user account associated with identifier 230 within database 108 (shown in FIGS. 1 and 2) and the current account balance. In one embodiment, server system 102 then determines 306 whether to approve or deny energy delivery from energy delivery point 104 to electric vehicle 110. For example, if the current account balance is less than a threshold amount, the customer may be denied service at energy delivery point 104. In such an embodiment, the customer may also be prompted to insert a credit card or cash into a payment acceptance device within energy delivery point 104. In another example, service may be denied by server system 102 if a stolen car report is associated with electric vehicle 110. In the exemplary embodiment, the current account balance may be increased remotely by the account owner using, for example, user workstation 216 (shown in FIG. 2). For example, the customer may login to server system 202 via user workstation 216 to access a program that enables the customer to designate a payment amount to be applied to the account balance. The customer may also designate a payment source such as, but not limited to only including, a credit card, a debit card, and/or a banking account. The payment amount is then credited to the account balance. In one embodiment, the customer may choose to preauthorize, prior to the delivery of energy to electric vehicle 110, payment of the transaction cost using a payment means other than the account associated with identifier 230, such using a credit card or a debit card.

In one embodiment, interface 236 may display the account balance to the customer, an approximate amount of time that electric vehicle 110 may remain parked at a particular parking rate, and/or an approximate amount of energy that may be delivered to electric vehicle 110 at a particular delivery rate. Moreover, in an alternative embodiment, interface 236 may indicate to, for example, passersby and/or parking enforcement officials, that the account balance includes funds sufficient to enable electric vehicle 110 to remain parked for an approximate amount of time and/or to receive an approximate amount of energy from energy delivery point 104. When the approximate amount of time and/or the approximate amount of energy is passed, interface 236 may then indicate that additional funds are required.

In an alternative embodiment, electric vehicle 110 is not identified as described above. Rather, the customer instead inserts a credit card or cash into a payment acceptance device within energy delivery point 104. Energy delivery point 104 may then deliver energy and track a parking status as described below.

In the exemplary embodiment, energy is then delivered 308 to electric vehicle 110 via energy delivery point 104. Delivery point meter 232 (shown in FIG. 2) meters 310 an amount of energy delivered. In the exemplary embodiment, server system 102 and/or energy delivery point 104 also meters 312 an amount of time that electric vehicle 110 occupies the parking space in order to determine a parking cost. A transaction amount is then determined 314 based on the metered amount of energy delivered via delivery point meter 232 and the parking cost. In one embodiment, energy delivery point 104 determines a transaction amount, and transmits the transaction amount to server system 102. In an alternative embodiment, energy delivery point 104 transmits the amount of energy delivered to server system 102, and server system 102 determines the transaction amount based on the amount of energy delivered and the parking cost. The parking cost may be based on an amount of time electric vehicle 110 is parked in the parking space and/or on a time of day that electric vehicle 110 occupies the parking space. For example, a parking cost may be higher during a peak usage time and/or at parking spaces that are closer to a destination than other parking spaces.

In one embodiment, the parking cost and/or the energy cost is validated based on an identity of the validating party. Energy delivery point 104 receives a validator identifier via, for example, an RFID tag embedded in a validation slip. As another example, the customer may input a validation code into energy delivery point 104 that identifies the validating party and/or a validation amount. The validator identifier is then used by server system 102 to determine, for example, whether the parking cost is to be adjusted and/or by what amount the parking cost is to be adjusted. Moreover, the validator identifier may be used by server system 102 to determine whether the energy cost is to be adjusted and/or by what amount the energy cost is to be adjusted. In some embodiments, the entire transaction cost may be adjusted by server system 102 based on the validator identifier.

In the exemplary embodiment, the transaction amount is then compared to the current balance in the customer account. If the transaction amount is less than the current balance, the transaction amount is deducted from the current balance. The new balance is then stored in database 108. In one embodiment, the new balance is transmitted by server system 102 to energy delivery point 104 and is displayed to the customer. In an alternative embodiment, the new balance is also transmitted to electric vehicle 110 by energy delivery point 104 and displayed to the customer via vehicle meter 234 (shown in FIG. 2). If the current balance is less than the transaction amount, the customer account may be credited with the difference between the transaction amount and the current balance and the customer billed for the difference at a later time. In such an embodiment, the billing rate may be changed for any energy distributed on credit. Alternatively, the customer may be prompted to submit payment at energy delivery point 104. For example, the customer may be prompted to insert a credit card into a payment acceptance device (not shown) within energy delivery point 104. In the exemplary embodiment, a confirmation of the receipt of the delivered energy is generated 316 by vehicle meter 234. The receipt may be used by the customer to verify an amount of energy delivered and/or a cost per unit energy. The receipt may be generated by electric vehicle 110 and stored in electric vehicle 110 and database 108. Alternatively, the receipt may be generated by server system 102, stored in database 108, and transmitted to electric vehicle 110 via energy delivery point 104. In addition, in one embodiment, an adjusted current balance may be displayed to the customer via interface 236 to reflect a deduction of the transaction amount from the account.

Described in detail herein are exemplary embodiments of methods, systems, and computers that facilitate metering electricity consumption for vehicles, such as electric vehicles, while parked at a parking meter. Moreover, providing electric vehicle charging at a parking meter facilitates enabling parking meter operators and/or utility operators to charge different rates for differently situated parking spaces and/or during different times. Furthermore, enabling customers to automatically deduct parking and energy distribution costs from an account facilitates providing the customer with a method of payment that does not require the customer to carry loose change and/or refill a parking meter. In addition, enabling automatic deduction of parking and energy distribution costs from a customer account enables parking meter operators and/or utility operators to collect revenue with fewer manual steps, such as manually emptying parking meters on a periodic basis.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A method for delivering energy to an electric vehicle, said method comprising:
   coupling the electric vehicle to an energy delivery point that includes a first meter;
   delivering energy to the electric vehicle;
   taking a first measurement using the first meter, wherein the first measurement is an amount of energy delivered to the electric vehicle;
   receiving, from the electric vehicle, a second measurement taken by a second meter at the electric vehicle, wherein the second measurement is an amount of energy received by the electric vehicle;
   comparing the first measurement taken by the first meter with the second measurement taken by the second meter;
   determining a parking cost associated with the electric vehicle; and
   determining transaction costs based on the results of the comparison and based on at least one of an amount of energy delivered to the electric vehicle and the parking cost.

2. A method in accordance with claim 1, further comprising receiving, by the energy delivery point, a unique identifier of the electric vehicle via one of a wireless connection and a wired connection.

3. A method in accordance with claim 2, further comprising identifying an account associated with the electric vehicle based on the vehicle identifier.

4. A method in accordance with claim 3, further comprising determining a balance of the account.

5. A method in accordance with claim 4, further comprising deducting at least a portion of the transaction costs from the account balance.

6. A method in accordance with claim 5, wherein deducting at least a portion of the transaction costs comprises deducting from the account balance at least one of the parking cost and an energy cost based on the first measurement of the amount of the energy delivered to the electric vehicle.

7. A method in accordance with claim 3, further comprising billing at least a portion of the transaction costs to the account for payment at a later time.

8. A method in accordance with claim 1, further comprising indicating a payment status on the energy delivery point.

9. A method in accordance with claim 1, further comprising validating at least a portion of the transaction cost by determining a validator identifier, and adjusting the transaction cost based on the validator identifier.

10. A method in accordance with claim 1, further comprising accepting an alternate form of payment at the energy delivery point, and applying the alternate form of payment to the transaction cost.

11. A system for providing energy delivery to an electric vehicle, said system comprising:
    an energy delivery point configured to couple to the electric vehicle via a connector, said energy delivery point configured to:
      deliver energy to the electric vehicle via said connector;
      take a first measurement using a first meter, wherein the first measurement is an amount of energy delivered to the electric vehicle, and wherein the first meter is located at the energy delivery point;
      receive, from the electric vehicle, a second measurement taken by a second meter at the electric vehicle, wherein the second measurement is an amount of energy received by the electric vehicle; and
      compare the first measurement taken by the first meter with the second measurement taken by the second meter; and
    a server sub-system coupled to said energy delivery point over a network, said server sub-system configured to determine a parking cost for the electric vehicle, and determine transaction costs based on the results of the comparison and based on at least one of an amount of energy delivered to the electric vehicle by said energy delivery point and the parking cost.

12. A system in accordance with claim 11, wherein said energy delivery point is configured to receive a unique identifier from the electric vehicle via one of said connector and a wired connection, said server sub-system is configured to determine a balance of an account associated with the identifier.

13. A system in accordance with claim 12, wherein said server system is configured to deduct at least a portion of the transaction costs from the account balance.

14. A system in accordance with claim 11, wherein said energy delivery point comprises an interface configured to display a payment status of the electric vehicle.

15. A system in accordance with claim 11, wherein said energy delivery point is configured to receive a validator identifier to facilitate adjusting the transaction costs.

16. A system in accordance with claim 11, wherein said energy delivery point is configured to receive an alternate form of payment to be applied to the transaction costs.

17. An energy delivery point for use with a system for delivering energy to an electric vehicle, said energy delivery point configured to:
    couple to the electric vehicle via a connector;
    receive a unique identifier from the electric vehicle to facilitate identifying a balance of an account associated with the identifier;
    deliver energy to the electric vehicle via the connector;
    take a first measurement using a first meter, wherein the first measurement is an amount of energy delivered to the electric vehicle, and wherein the first meter is located at the energy delivery point;
    receive, from the electric vehicle, a second measurement taken by a second meter at the electric vehicle, wherein the second measurement is an amount of energy received by the electric vehicle;
    compare the first measurement taken by the first meter with the second measurement taken by the second meter; and display a transaction cost that is based on the results of the comparison and based on at least one of the amount of energy delivered to the electric vehicle and a parking cost.

18. An energy delivery point in accordance with claim 17, wherein said energy delivery point is further configured to display a payment status of the electric vehicle.

19. An energy delivery point in accordance with claim 17, wherein said energy delivery point is further configured to receive a validator identifier to facilitate adjusting the transaction cost.

20. An energy delivery point in accordance with claim 17, wherein said energy delivery point is further configured to receive an alternate form of payment to be applied to the transaction cost.

* * * * *